Figure 1:
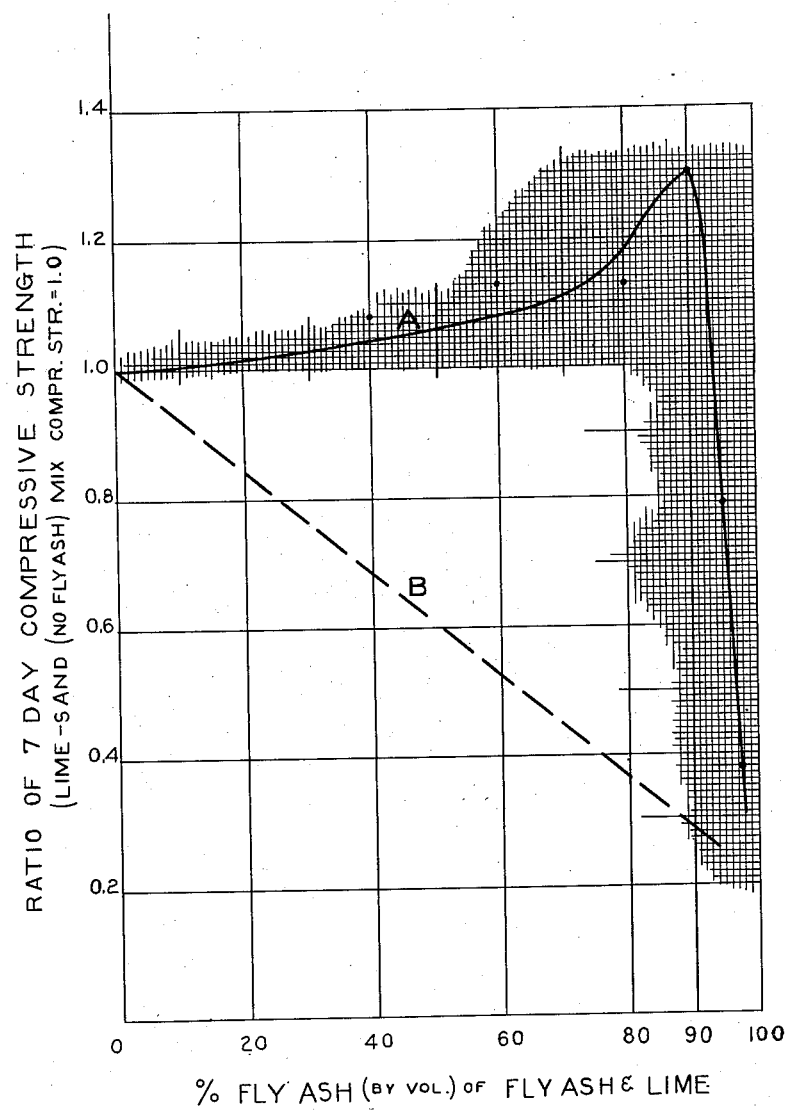

Patented Aug. 21, 1951

2,564,690

UNITED STATES PATENT OFFICE 2,564,690

HYDRATED LIME-FLY ASH-FINE AGGREGATE CEMENT

Jules E. Havelin, Havertown, and Frank Kahn, Philadelphia, Pa.

Application June 30, 1948, Serial No. 36,048

4 Claims. (Cl. 106—120)

This invention relates to novel hydrated lime-fly ash-fine aggregate cements especially useful for masonry mortar, protective coating, soil stabilization and grouting compositions and particularly to hydrated lime-fly ash-fine aggregate compositions of this type having early compressive strengths exceeding the corresponding early compressive strengths of the lime-fine aggregate mortar compositions of the prior art.

For many years the masonry mortar and protective coating art has operated on the supposition that the compressive strength of lime mortars is increased by adding lime and is decreased by a reduction in the proportion of lime to fine aggregate. This decrease in compressive strength with reduction in lime and the extent thereof is well known in this art and the various attempts to reduce the lime proportion without loss in compressive strength have been unsuccessful. In its broad aspect the present invention is directed to the provision of hydrated lime fly ash-fine aggregate cements useful as masonry mortars, protective coatings such as plaster, soil stabilization and construction filling materials such as groutings having compressive strengths exceeding those of the prior art lime mortars of corresponding lime proportion. For some applications the magnitude of improvement in early compressive strength need not be large, since a relatively small increase in early compressive strength will provide a cement having characteristics equal to or better than a prior art lime mortar of very much higher lime content. However, for other applications, particularly in the field of industrial construction, a mortar of very much higher early compressive strength is required and in these fields lime mortars have been largely displaced because early compressive strengths of the magnitude required are not obtainable in a lime-fine aggregate mortar even with very large proportions of lime. This characteristic of low compressive strength has been considered by the art as inherent in lime-fine aggregate mortars and consequently the art has turned to Portland cement mortars and the like.

As used throughout this specification and claims the terms "hydrated lime" and lime are used interchangeably to indicate a dry powder obtained by treating quicklime with water enough to satisfy its chemical affinity for water under the conditions of its hydration. It consists essentially of calcium hydrate or a mixture of calcium hydrate and magnesium oxide and magnesium hydroxide. In the above definition quicklime is used to indicate a calcined material the major portion of which is calcium oxide or calcium oxide in natural association with a lesser amount of magnesium oxide capable of slaking with water.

As defined above and as used throughout the present specification and claims, the term "hydrated lime" or "lime" is not intended to include hydraulic lime or the free lime made available in the hydration of Portland cement, natural cements and the like. Lime from such sources differs from the hydrated lime of the present invention and does not give the results hereinafter described.

The term "fly ash" as used in the present specification is intended to indicate the finely divided ash residue produced by the combustion of pulverized coal which ash is carried off with the gases exhausted from the furnace in which the coal is burned and which is collected from these gases usually by means of suitable precipitation apparatus such as electrical precipitators. The fly ash so obtained is in a finely divided state such that at least about 70% passes through a 200 mesh sieve.

The term "fine aggregate" as used throughout this specification and the claims hereof is intended to indicate natural or artificial substantially chemically inert inorganic materials such as natural sand, sand prepared from stone, blast-furnace slag, gravel, or other inert materials having similar characteristics, substantially as defined in A. S. T. M. Tentative Standard Specifications for Concrete Aggregates, Designation C33—37T, and having a fineness modulus of at least substantially 1.7, substantially all of which will pass a ⅜ inch sieve, substantially 95% or more of which will pass a No. 4 sieve, substantially 45% or more of which will pass a No. 16 sieve, and substantially 5% or more of which will pass a No. 50 sieve.

So far as we are aware no lime mortars have been made available to the art which have set under normal conditions to a compressive strength of the order of about 225 pounds per square inch and above in a period of seven days. As used in the present specification and claims the term "high compressive strength" is intended to cover the range from about 225 pounds per square inch and above after 7 days and the term "low compressive strength" is intended to cover the range from about 225 pounds per square inch and below after 7 days.

The principal object of the present invention is to provide hydrated lime-fly ash-fine aggregate cement compositions having greater early compressive strengths than the lime mortar compositions of the prior art having comparable lime content.

A further object of the present invention is to provide hydrated lime-fly ash-fine aggregate cement compositions having high early compressive strengths of the order of 225 pounds per square inch and above.

A further object of the present invention is to provide a hydrated lime-fly ash-fine aggregate cement comparable in early compressive strength to the known cement mortars.

Heretofore, the addition of fly ash to Portland cements has been investigated and certain advantageous results based upon the so-called "puzzolanic" effect have been referred to in the art. While the reaction underlying the puzzolanic effect is not entirely understood it is said to involve a chemical reaction between the lime content of the cement and the silica content of the fly ash. However, this reaction does not involve hydrated lime and fly ash and should not be confused with the present invention. So far as we are aware the prior art has not successfully combined hydrated lime and fly ash in the making of a useful hydrated lime cement, capable of developing practical high early strengths when allowed to set under ambient conditions within the range of normally occurring atmospheric temperatures and humidities. Moreover, in the Portland cement art the addition of fly ash has not produced particularly significant increases in early compressive strength which is one of the principal advantages of the present invention.

The effect of puzzolanic materials in Portland cement concretes is evidenced by their producing an increase in long-time compressive strength, and it is indicated that their use may result in decreased early compressive strength.

In contrast with the low early strength characteristic of the puzzolanic effect, applicants' invention produces a high early compressive strength. In fact, the high early strength feature of applicants' invention can be used to increase substantially the early strength characteristic of Portland cement mixes.

We attain the objects of the present invention by means of a dry mix comprising hydrated lime, fly ash and a suitable fine aggregate to which water is added in suitable proportion in making up the final working composition.

In the drawings Fig. 1 shows in the curve marked A a plot of the compositions specifically set forth in Table I which follows. Curve B represents a hypothetical curve which is the relationship that would be normally expected from knowledge of the prior art.

Figure 2:
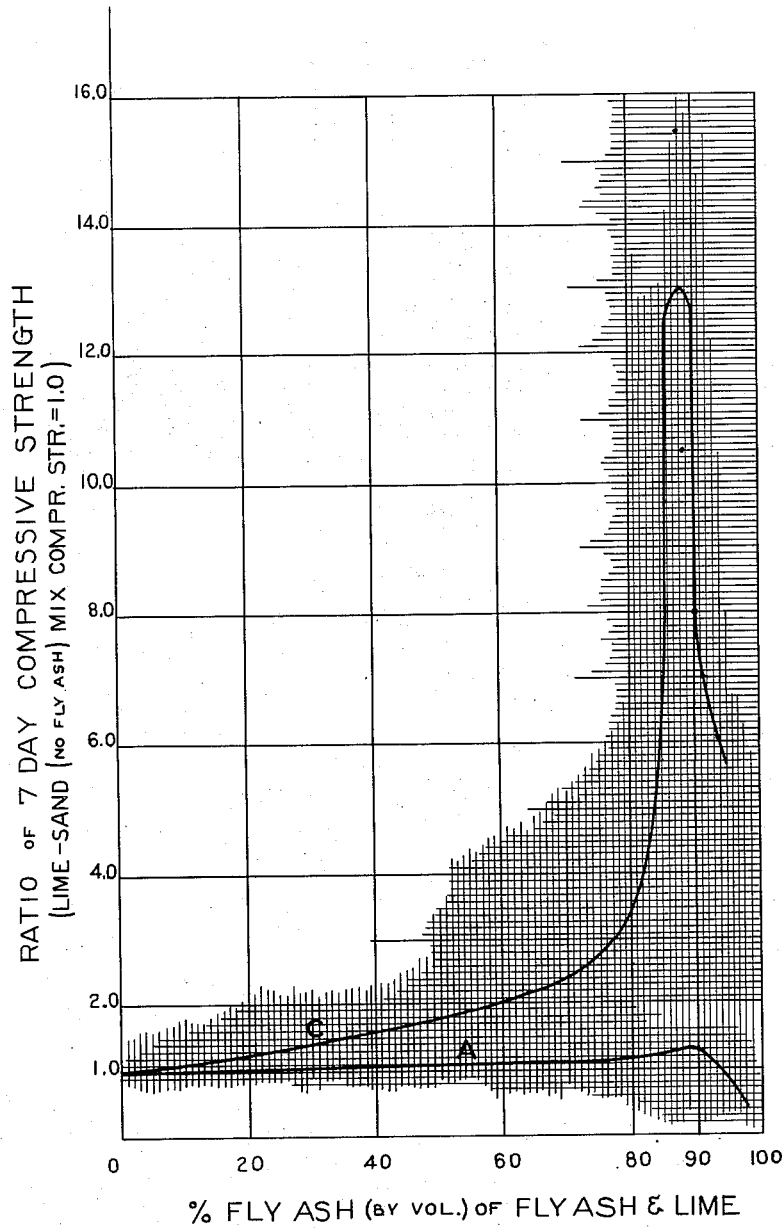

In Fig. 2 the curve marked A is the same as curve A of Fig. 1 but plotted on a different scale. Curve C is a plot of the compositions specifically set forth in Table II.

The data set forth in the following tables taken in conjunction with the curves of Fig. 1 and Fig. 2 will serve to illustrate the present invention as hereinafter described.

Table I (parts by volume)

| Hydrated Lime | Fly Ash | Sand | Per Cent Fly Ash (of Fly Ash and Lime) | Ratio of 7 Day Compressive Strength |
|---|---|---|---|---|
| 50 | 0 | 50 | 0 | 1.00 |
| 40 | 10 | 50 | 20 | 1.00 |
| 30 | 20 | 50 | 40 | 1.08 |
| 20 | 30 | 50 | 60 | 1.13 |
| 10 | 40 | 50 | 80 | 1.13 |
| 5 | 45 | 50 | 90 | 1.30 |
| 2.5 | 47.5 | 50 | 95 | 0.79 |
| 1.25 | 48.75 | 50 | 97.5 | 0.38 |

Table II (parts by volume)

| Hydrated Lime | Fly Ash | Sand | Per Cent Fly Ash (of Fly Ash and Lime) | Ratio of 7 Day Compressive Strength |
|---|---|---|---|---|
| 5 | 0 | 95 | 0 | 1.00 |
| 5 | 19 | 76 | 79.2 | 3.12 |
| 5 | 38 | 57 | 88.4 | 10.50 |
| 5 | 47.5 | 47.5 | 90.4 | 8.01 |
| 5 | 57 | 38 | 92.0 | 7.01 |
| 5 | 76 | 19 | 93.7 | 6.05 |
| 6.25 | 0 | 93.75 | 0 | 1.00 |
| 6.25 | 37.5 | 56.25 | 85.9 | 10.7 |
| 6.25 | 46.875 | 46.875 | 88.0 | 15.4 |

Table III (parts by volume)

| Lime | Fly Ash | Sand | Lime/Fly Ash and Sand | 7 Day Compressive Strength (in p. s. i.) |
|---|---|---|---|---|
| 3.84 | 48.08 | 48.08 | 1 part lime to 25 parts fly ash and sand. | 230 |
| 5.0 | 38.0 | 57.0 | 1 part lime to 19 parts fly ash and sand. | 427 |
| 6.2 | 37.5 | 56.3 | 1 part lime to 15 parts fly ash and sand. | 273 |

It will be noted from the curves of Figs. 1 and 2 that the optimum 7 day compressive strengths occur in the range from one part hydrated lime to about 5 parts fly ash to one part hydrated lime to about 15 parts fly ash which values correspond to about 83% fly ash and 93.7% fly ash respectively calculated on the sum of the hydrated lime and fly ash. In obtaining the novel hydrated lime-fly ash-fine aggregate cements of the present invention within this range a suitable proportion of fine aggregate must be used. High early compressive strengths are obtained in the particular range lying between one part hydrated lime to about 15 parts fly ash and sand by volume and one part lime to about 25 parts fly ash and sand by volume as indicated in the data listed in Table III. The data plotted in curve C is devoted almost entirely to a high compressive strength type mixture having a lime to fly ash and sand ratio of one to 19, there being one point lying directly above the peak which represents a composition in which the ratio of lime to fly ash and sand is one to 15 and a second point corresponding to the next to the last composition of Table II in which the ratio of lime to fly ash and sand is one to 15. The optimum ratio of hydrated lime to fly ash is not materially changed by variations in the amount of water used in preparing the final cement mix although the absolute compressive strength values will be stronger where the amount of water is not greater than that required to give the desired flow of 100 on a standard flow table.

The proportions given in the tables and in the examples which follow are based upon the following weights per cubic foot for the solid ingredients:

```
                                          Pounds per
                                          cubic foot
Lime _____     45
Fly ash _____     60
Sand _____     80
```

It will be apparent to those skilled in the art that in the tables and in the examples parts by volume can easily be converted to parts by weight and that parts by weight can easily be converted to parts by volume using the above weight per cubic foot values in calculating the conversions.

In preparing the compositions set forth in the above tables, several mixing procedures were followed. For example, the compositions of Tables II and III were prepared by following the general procedure for mixing test specimens as outlined in A. S. T. M. C109—44. Specimens of each mix were prepared in cubes measuring 2 inches in each dimension and these cubes were stored in molds in laboratory air for seven days after which they were removed and tested for compressive strength following the standard A. S. T. M. compressive strength procedure. In each case water was added to give a flow of 100 as measured on an A. S. T. M. standard flow table. In order to obtain optimum results in the practice of the present invention the amount of water added to the dry mix should be the minimum amount required to obtain the desired flow but as pointed out above the optimum ratio of fly ash to hydrated lime is not changed by using more or less water. We have found that other mixing procedures produce results following the same general curve which gives the relative compressive strengths although the absolute values may differ and in fact may be materially increased by intimate intermixture as described in detail in the examples below.

As preferred examples for obtaining hydrated lime-fly ash-fine aggregate cements having high early compressive strengths, we direct attention to the following examples:

EXAMPLE I

Hydrated lime_____parts by volume__ 5
Fly ash_____do____ 38
Sand (fineness modulus, 1.7)_____do____ 57
Water to lime ratio (by weight)_____ 5.40 to 1
Compressive strength (7 days)____p. s. i__ 427

The dry mix of the above example was prepared by following the procedure outlined in A. S. T. M. C109—44 referred to above and the compressive strength was measured on the two inch test cubes using the A. S. T. M. standard compressive strength test procedure.

EXAMPLE II

Hydrated lime_____parts by volume 5
Fly ash_____do____ 38
Sand (fineness modulus, 1.7)_____do____ 57
Water to lime ratio (by weight)_____ 4.17 to 1
Compressive strength (7 days)_____ 652

The dry mix of Example II was prepared by intimately mixing the hydrated lime and the fly ash in a ball mill for 15 minutes after which these ingredients were thoroughly mixed, while dry, with the sand. The dry mix thus obtained was converted to a masonry mortar having a desired consistency by the addition of water as indicated. The 7 day compressive strength of Example II was about 650 lbs. per square inch. It will be noted that this example has a higher compressive strength and requires a smaller proportion of water than the earlier example which is attributable to the ball milling step in place of the hand mixing step of the A. S. T. M. procedure.

EXAMPLE III

Hydrated lime_____parts by volume__ 3.84
Fly ash_____do____ 48.08
Sand (fineness modulus, 1.7)_____do____ 48.08
Water to lime ratio (by weight)_____ 8.1 to 1
Compressive strength (7 days)_____ 230

The mixing procedure followed for Example III was the A. S. T. M. procedure given above.

It will be noted that the compressive strength is lower than that of Example I although it still exceeds 225 pounds per square inch. This comparative decrease in compressive strength probably results from the increased amount of sand in Example III where the ratio of lime to fly ash and sand by volume is 1 to 25. In this case we have found that where the ratio of lime to fly ash is selected in the range between about one to 5 and about one to 15 high early compressive strength results are obtained by using the amount of fine aggregate calculated to hold the ratio of lime to fly ash plus fine aggregate between one to 15 by volume to one to 25 by volume, provided, however, that the ratio of fine aggregate to fly ash plus fine aggregate is maintained in the range from about 1 to 1.5 to about 1 to 2.5.

From the above it will be apparent, particularly to those skilled in the art, that we have provided a new hydrated lime cement having wholly unexpected properties and in certain cases surprisingly large early compressive strength values. We have pointed out above the sharp increase in compressive strength which occurs in a relatively narrow range in which the ratio of fly ash to hydrated lime is very high. The degree of improvement is likewise partly dependent on the manner of mixing and on the proportion of hydrated lime and of fine aggregate to fly ash plus fine aggregate. In the prior art the proportion of hydrated lime to aggregate has covered the range (in parts by volume) from one part of hydrated lime to from about 2½ parts to about 4 parts aggregate. For many years the art has considered that any substantial decrease in hydrated lime relative to aggregate material would result in mortars and plasters having undesirable characteristics including low early compressive strengths. From the foregoing detailed description of the present inventon, it will be noted that the ratio of hydrated lime to other solid ingredients of the mix employed in the practice of the present invention where high early compressive strengths are required is of the order of from one part hydrated lime to about 15 parts of other solid ingredients to one part hydrated lime to about 25 parts of other solid ingredients. So far as we are aware, these proportions are not only unknown in the lime mortar art but are contrary to the previously held teachings thereof.

It will be seen that the present invention provides a choice of hydrated lime-fly ash-fine aggregate cement compositions which may vary depending upon the particular requirements of the specific use to which the cement is to be put. Where relatively low early compressive strength is all that is required, the prior art lime to other solid ingredient ratios may be employed, in which case the resulting hydrated lime-fly ash-fine aggregate cement will have improved characteristics as compared to prior art lime mortars of comparable lime content. Compositions such as shown in Examples I, II and III may be employed where a cement of high early compressive strength is required. So far as we are aware hydrated lime mortars having the characteristics of the embodiments referred to above have not been available to the art prior to our invention which therefore represents a new development in the hydrated lime mortar art and particularly provides a novel hydrated lime-fly ash-fine aggregate cement composition suitable for masonry mortar, protective coatings such as plaster, soil stabilization and filling materials such as grouting.

It will be understood that the basic ingredients comprising hydrated lime, fly ash and sand may vary as to specific volume from the values given but it is intended that such variations shall be included within the scope of the present invention as hereinafter claimed. It will likewise be understood that various additive ingredients may be used in addition to the basic ingredients referred to without departing from the present invention as hereinafter claimed.

This application is a continuation in part of our prior application Serial No. 546,208, filed July 22, 1944, and now abandoned.

Having thus described our invention, we claim:

1. A hydrated lime-fly ash-fine aggregate cement having high early compressive strength when mixed with water in suitable amount and allowed to set, consisting essentially of hydrated lime, fly ash and an aggregate of substantially chemically inert inorganic material having a fineness modulus of at least substantially 1.7, substantially all of which will pass a ⅜ inch sieve, substantially 95% or more of which will pass a No. 4 sieve, substantially 45% or more of which will pass a No. 16 sieve, and substantially 5% or more of which will pass a No. 50 sieve, the ratio of hydrated lime to fly ash being from about 1 to 5 to about 1 to 15 by volume, the ratio of hydrated lime to fly ash plus fine aggregate being from about 1 to 15 to about 1 to 25 by volume and the ratio of fine aggregate to fly ash plus fine aggregate being from about 1 to 1.5 to about 1 to 2.5 by volume.

2. A cement and protective coating composition having high early compressive strength when mixed with water in suitable amount and allowed to set, consisting essentially of hydrated lime about 1 part by volume, fly ash from about 7.5 to about 12.5 parts by volume and from about 7.5 to about 12.5 parts by volume of an aggregate of substantially chemically inert inorganic material having a fineness modulus of at least substantially 1.7, substantially all of which will pass a ⅜ inch sieve, substantially 95% or more of which will pass a No. 4 sieve, substantially 45% or more of which will pass a No. 16 sieve, and substantially 5% or more of which will pass a No. 50 sieve.

3. A cement and protective coating composition having high early compressive strength when mixed with water in suitable amount and allowed to set, consisting essentially of hydrated lime about 5 parts by volume, fly ash about 38 parts by volume and an aggregate of substantially chemically inert inorganic material having a fineness modulus of at least substantially 1.7, substantially all of which will pass a ⅜ inch sieve, substantially 95% or more of which will pass a No. 4 sieve, substantially 45% or more of which will pass a No. 16 sieve, and substantially 5% or more of which will pass a No. 50 sieve.

4. A structural material possessing high early compressive strength, produced by mixing hydrated lime, fly ash, an aggregate of substantially chemically inert inorganic material having a fineness modulus of at least substantially 1.7, substantially all of which will pass a ⅜ inch sieve, substantially 95% or more of which will pass a No. 4 sieve, substantially 45% or more of which will pass a No. 16 sieve, and substantially 5% or more of which will pass a No. 50 sieve, and a suitable amount of water, the ratio of hydrated lime to fly ash being from about 1 to 5 to about 1 to 15 by volume, the ratio of hydrated lime to fly ash plus aggregate being from about 1 to 15 to about 1 to 25 by volume and the ratio of aggregate to fly ash plus aggregate being from about 1 to 1.5 to about 1 to 2.5 by volume, the mixture being subjected for a suitable time to ambient conditions within the range of normally occurring atmospheric temperatures and humidities.

JULES E. HAVELIN.
FRANK KAHN.

REFERENCES CITED

The following references are of record in the file of this patent:

UNITED STATES PATENTS

| Number | Name | Date |
|---|---|---|
| 1,886,933 | Askenasy | Nov. 8, 1932 |
| 1,942,770 | Peffer et al. | Jan. 9, 1934 |
| 2,250,107 | Nelles | July 22, 1941 |

FOREIGN PATENTS

| Number | Country | Date |
|---|---|---|
| 381,223 | Great Britain | 1932 |